(12) United States Patent
Lorenz et al.

(10) Patent No.: US 9,578,122 B1
(45) Date of Patent: Feb. 21, 2017

(54) COMMUNICATING AN E-MAIL FROM A SENDER TO A PLURALITY OF RECIPIENTS

(71) Applicant: International Business Machines Corporation, Armonk, NY (US)

(72) Inventors: Simon Lorenz, Geisenheim (DE); Oliver Steiner, Wiesbaden (DE); Rainer Wolafka, Hofheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/961,932

(22) Filed: Dec. 8, 2015

(51) Int. Cl.
  *G06F 15/16* (2006.01)
  *H04L 29/08* (2006.01)
  *H04L 12/58* (2006.01)

(52) U.S. Cl.
  CPC ........... *H04L 67/2804* (2013.01); *H04L 51/04* (2013.01); *H04L 67/1095* (2013.01)

(58) Field of Classification Search
  None
  See application file for complete search history.

(56) References Cited

U.S. PATENT DOCUMENTS

| | | | |
|---|---|---|---|
| 6,192,396 B1 | 2/2001 | Kohler | |
| 6,529,942 B1 | 3/2003 | Gilbert | |
| 6,816,887 B1 | 11/2004 | Shaw et al. | |
| 7,730,139 B2 * | 6/2010 | Worthington | H04L 12/58 709/206 |
| 8,185,591 B1 | 5/2012 | Lewis | |
| 8,375,082 B2 * | 2/2013 | Mukherjee | H04L 12/1813 709/204 |
| 8,467,500 B2 * | 6/2013 | Hidajat | H04M 1/2473 379/37 |
| 8,543,656 B2 | 9/2013 | Khoo | |
| 8,682,529 B1 | 3/2014 | Church et al. | |
| 8,788,593 B1 | 7/2014 | Tong et al. | |
| 8,799,379 B1 * | 8/2014 | Liden | G06Q 10/107 709/206 |
| 8,826,148 B2 | 9/2014 | Yuniardi et al. | |
| 8,935,344 B2 * | 1/2015 | Mayala | G06Q 10/107 709/206 |
| 9,124,641 B2 * | 9/2015 | Baskaran | G06F 21/6209 |
| 9,241,069 B2 * | 1/2016 | Mohler | H04M 3/5116 |

(Continued)

FOREIGN PATENT DOCUMENTS

WO  0235401 A1  5/2002

OTHER PUBLICATIONS

Whatls.com, definition of e-mail, Jul. 18, 2015, 2 pages.*

(Continued)

*Primary Examiner* — Joshua Joo
(74) *Attorney, Agent, or Firm* — Nolan M. Lawrence

(57) ABSTRACT

An e-mail comprising general content is communicated from a sender to a plurality of recipients. The general content is identical for all recipients of the plurality of recipients. A definition of the plurality of recipients for the e-mail is received. The general content of the e-mail is received. A tag is inserted into the e-mail. The tag is indicative of personalized information designated for a recipient of the plurality of recipients. The e-mail is sent to the plurality of recipients. The general content is adapted with dynamically-generated content. The adaptation is based on the tag and based on the personalized information.

12 Claims, 6 Drawing Sheets

(56) References Cited

U.S. PATENT DOCUMENTS

| | | | |
|---|---|---|---|
| 2004/0078595 A1* | 4/2004 | Kent, Jr. | G06Q 10/107 713/160 |
| 2006/0230275 A1* | 10/2006 | Olivier | G06Q 10/107 713/176 |
| 2007/0106736 A1 | 5/2007 | Shepherd | |
| 2007/0299926 A1* | 12/2007 | Malik | G06Q 10/107 709/206 |
| 2008/0222257 A1 | 9/2008 | Mukherjee et al. | |
| 2010/0125478 A1* | 5/2010 | Bisht | G06Q 10/109 705/7.19 |
| 2012/0124143 A1 | 5/2012 | Chung et al. | |
| 2012/0300932 A1* | 11/2012 | Cambridge | H04L 9/3234 380/270 |
| 2013/0080554 A1* | 3/2013 | Addante | H04L 51/14 709/206 |
| 2013/0346510 A1 | 12/2013 | Mohit et al. | |
| 2014/0222702 A1* | 8/2014 | Jennings | G06Q 50/01 705/319 |
| 2015/0012598 A1* | 1/2015 | Klimt | H04L 51/20 709/206 |
| 2015/0156220 A1* | 6/2015 | Baskaran | G06F 21/6209 726/1 |

OTHER PUBLICATIONS

ATIS Telecom Glossary, definition of e-mail, Mar. 13, 2013, 2 pages.*
Mahajan, S., "Decluttering General Communication Message for Specific Audience", U.S. Appl. No. 14/961,926, filed Dec. 8, 2015.
List of IBM Patents or Patent Applications Treated as Related, Dec. 4, 2015, 2 pages.

* cited by examiner

COMMUNICATING AN E-MAIL FROM A SENDER TO A PLURALITY OF RECIPIENTS

BACKGROUND

The present disclosure relates to communicating an e-mail from a sender to a plurality of recipients.

Group mailing lists make it easy to reach multiple persons by just adding the group name into the recipient address filed. The mail body content is then sent to the list of recipients corresponding to the group name. While this is a fast way of reaching a group of people with the same message, it is always the exact same message that is sent to each of the recipients.

SUMMARY

Embodiments of the present disclosure provide for a method, system, and computer program product for communicating an e-mail from a sender to a plurality of recipients. Embodiments of the disclosure may be freely combined which each other where applicable.

In one aspect the disclosure relates to a method and system for communicating an e-mail from a sender to a plurality of recipients, the e-mail comprising general content. The general content is identical for all recipients of the plurality of recipients. A definition of the plurality of recipients for the e-mail is received. The general content of the e-mail is received. A tag is inserted into the e-mail. The tag is indicative of personalized information designated for a recipient of the plurality of recipients. The e-mail is sent to the plurality of recipients. The general content is adapted with dynamically-generated content. The adaptation is based on the tag and based on the personalized information.

In another aspect the disclosure relates to a computer program product comprising machine executable instructions for performing the method as described above.

In yet another aspect the disclosure relates to a computer program product for processing an e-mail by an e-mail client of a recipient of the e-mail. The e-mail comprises a general content and a tag. The computer program product comprises a non-transitory computer readable storage medium having program instructions embodied therewith. The program instruction instructions are configured to cause, when read by a processor, a method. As part of the method, an e-mail is received by the e-mail client. The e-mail client adds, based on the tag, dynamically-generated content to the e-mail. The dynamically-generated content comprises personalized information for the recipient. The e-mail client provides the e-mail to the recipient. The e-mail comprises the general content and the dynamically-generated content.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
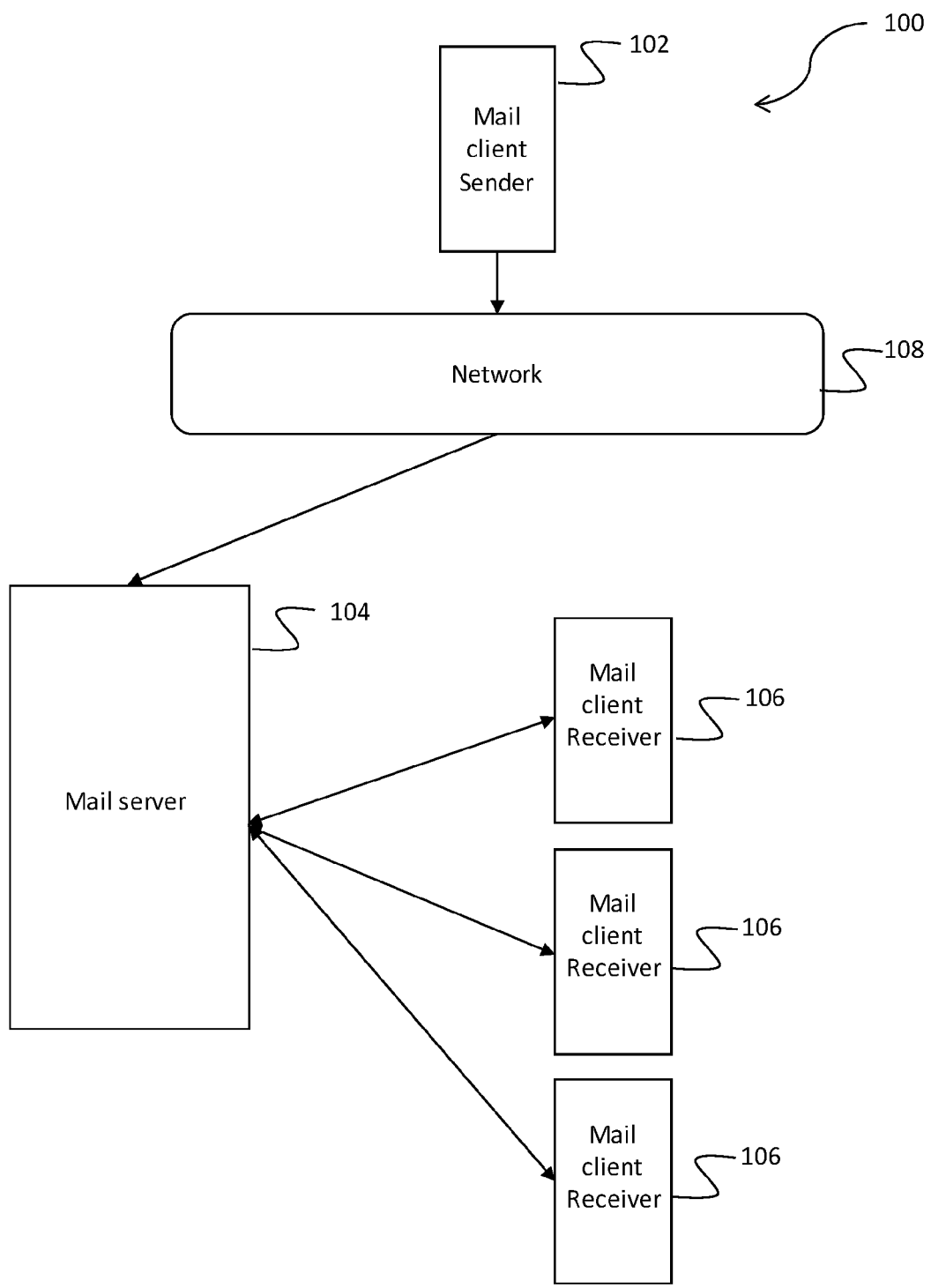
FIG. 1 depicts a block diagram of a telecommunication system as known in the art.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to communicating an e-mail from a sender to a plurality of recipients. While the present disclosure is not necessarily limited to such applications, various aspects of the disclosure may be appreciated through a discussion of various examples using this context.

The "content" of an e-mail as described herein may be understood as any kind of digital information for example text, images, hyperlinks, tables, or other information which is intended by the sender of the e-mail for display to or further use by the recipient of the e-mail. Further, the content of an e-mail is not limited to the mail body but may also be understood as the header/subject of an e-mail, the layout and general appearance of the e-mail upon display or the attachments of an e-mail.

As an example, the sender of the e-mail may intend to send the e-mail to a plurality of recipients, wherein the e-mail may comprise text information. Upon creation of the e-mail, the sender of the e-mail may mark parts of the text comprised in the e-mail for display for only a subset of the recipients. To ensure that the corresponding text passages are only displayed to this subset of recipients the mail client of the sender introduces tags into the e-mail specifying which text passages may be read by which recipient.

Upon receiving such an e-mail by a recipient, as specified by the sender, the mail client of the recipient may scan the e-mail for tags. Once such a tag is found, the e-mail client may determine whether the contents indicated by the tag are meant to be displayed to the recipient. In a case where the content is intended for display to the user, the mail client may prepare the e-mail accordingly and present the e-mail to the corresponding recipient. However, if it is determined that at least parts of the mail content is not meant for being provided to the recipient, the corresponding mail client may provide an e-mail to the recipient wherein the corresponding parts of the mail content are missing. As a result the same e-mail may be sent to a plurality of recipients, while the mail clients of the recipients process the e-mail thereby creating a personalized version of the received e-mail.

As another example, the content of the e-mail may not be comprised in the e-mail at the moment the e-mail is sent to the plurality of recipients. For example the content to be included in the e-mail may be created by the e-mail client of the recipient itself. To this end the tag included in the e-mail may comprise information for informing the client on how to create the dynamically-generated content. This way it may even be possible to include data in an e-mail which cannot be accessed at the time the e-mail is sent. Assume for example an e-mail comprising an invitation to an event. The e-mail comprises a tag which is meant to create directions for the recipient of the e-mail that allow the recipient to attend the event. The directions may however be dependent on the current location of the recipient at the moment the e-mail is processed by the recipients e-mail client. For example the e-mail may be processed by an e-mail client provided on a portable device like a smart phone. In this case the tag could cause the client of the recipient to query a navigation or guidance system provided on the smart phone to provide the directions by using the information on the target location of the event and the current location of the smart phone. The thus determined directions are then incorporated into the e-mail at the position indicated by the tag. As a result an e-mail already comprising the corresponding directions can be provided to the recipient.

In some embodiments the dynamically-generated content may depend on the date and/or time and/or location at which the tag is interpreted or received. Again assume an e-mail comprising an invitation to an event which will take place on a predefined date, on a predefined time and at a certain location. The tag may comprise information on the corresponding date, time and location of the event. The tag may cause the client of the recipient to determine, upon interpretation of the tag, whether the event is already over. If it is determined that the event is already over, the mail client may, for example, excise the corresponding part of the e-mail or may introduce an invitation for a subsequent event which is still to come. If it is determined that the event is still the come, the interpretation of the tag may cause the e-mail client to determine directions for how to get to the event starting from the location at which the tag has been interpreted as described before. This embodiment again may have the advantage that the e-mail can comprise information which could not possibly be included into the e-mail at the moment the e-mail was created by the sender.

In some embodiments the tag specifies a remote data source like an internet server and the corresponding internet address. The interpreting the tag in this case may comprise querying the remote data source for the dynamically-generated content which has to be inserted into the e-mail. Assume for example an e-mail is sent to the participants of a meeting which has just recently ended. Further assume that the participants of the meeting visited a plurality of talks, wherein for each talk a list of the attending participants has been created. The tag comprised in the e-mail may now cause the client of a recipient to query the data server of the meeting for the summaries of the talks the recipient attended during the meeting. To this end, the client may forward information indicative of the recipient's identity to the remote data source, whereupon the remote data source determines which talks the recipient attended. The summaries of the corresponding talks may then be provided to the client and may be introduced into the e-mail.

Further the tag may, for example, cause the e-mail client of the recipient to query a weather forecasting service for the current weather at the location of the recipient. To this end the client of the recipient may, upon interpreting the tag, forward information indicative of the current location of the device the e-mail is processed on to a weather forecasting service. The weather forecasting service may then provide corresponding weather information for the e-mail. As a result, embodiments may have the advantage that the e-mail can comprise personalized data for a recipient wherein the data further could not be included into the e-mail at the time the e-mail was created.

The tag may even cause the e-mail client to query a social network for information on the recipient like preferred music, sports activities, films and so forth and tailor the proposed leisure activities to these personal interests.

In some embodiments the method further comprises receiving of a command instruction from the recipient user and informing the remote data source about the command instruction. In this case the command instruction may be adapted for modifying further dynamically-generated content queried from the remote data source for further recipients of the e-mail. Again assume the example of an e-mail comprising an invitation to an event. The event may, for example, only be attended by a limited number of people. To this end, the e-mail may comprise a button for the recipient allowing the recipient to choose whether or not he intends to attend the event. Prior to displaying said button the e-mail client of the recipient queries the remote data source to determine whether the recipient may still attend the event or whether the maximum number of participants has already been reached. If the remote data source returns information indicative that the maximum number of participants has not yet been reached, the button is displayed to the recipient.

If the recipient wants to attend the event, the recipient may press the corresponding button thereby creating the command instruction. This command instruction may then be provided to the remote data source, thereby informing the remote data source that the recipient is going to attend the event. The data source may then count the number of confirmations received and may determine whether the maximum number of participants has already been reached. Once the maximum number of participants has been reached, the following queries of other mail clients will be denied, thereby informing the mail clients of the remaining recipients that the maximum number of participants has already been reached. As a result, the mail clients may be configured to not display the button for confirmation any more or even excise the whole invitation from the e-mail. This may have the advantage that the contents of the e-mail can be adapted to boundary conditions which may change even after the e-mail has been sent. Further it is possible that the e-mails or the interactions of recipients with e-mails may affect the e-mail displayed to the remaining recipients of the plurality of recipients.

In some embodiments, the e-mail comprises an encrypted data element, the encrypted data element may be decipherable only by the e-mail clients of a subset of the plurality of recipients. The interpreting the tag in this case may comprise the decrypting of the encrypted data element, thereby generating the dynamically-generated content to be added to the e-mail. The sender of the e-mail may, for example, write down a text message and mark certain parts of the text as being intended to be read only by a subset of the plurality of recipients. As a result the sender client may encrypt the corresponding text passages for example using a public key cryptography scheme. As a result the text passages may only be read by the group of recipients that are meant to read the text passages. This approach may also be used for attachments of the e-mail.

In some embodiments, the e-mail is sent from the sender to a mail-server. The interpreting the tag comprised in the e-mail is then conducted by the mail-server, thereby creating a plurality of personalized e-mails comprising the dynamically-generated content. The method in this case may further comprise sending the plurality of personalized e-mails to the plurality of recipients by the mail-server.

Embodiments may have the advantage that by using a mail server for creating the dynamically-generated content, the device of the recipient may be de-burdened from the processing load caused by the interpretation of the tags. This may especially be useful in situations where the recipient devices are mobile phones or tablet PCs with limited data processing capabilities and battery capacity. The decision whether or not to process the tags using a mail-server or process the tags by the client of the recipient may be dependent on the number of e-mails or the number of recipients of the e-mail. Especially in the case of a large number of recipients, the processing overhead caused by the interpretation of the tags may become prohibitive.

Thus, in some embodiments, the interpreting of the tag comprised in the e-mail is conducted by the e-mail client of recipient upon receiving the e-mail or upon a request of a recipient to view the contents of the e-mail. This way the processing load caused by the interpretation of the tags can be divided between the data processing devices of the plurality of recipients.

FIG. 1 depicts a schematic of a telecommunication system 100 as known in the art. The telecommunication system 100 comprises the mail client of the sender 102, a mail server 104 and a plurality of mail clients of recipients 106. The mail client of the sender 102, the mail server 104 and the mail clients of the recipients 106 are connected via a network 108. The network 108 may for example be the Internet. The mail clients 102 and 106 may for example be data processing devices like smart phones, tablet PCs, personal computers and the like, wherein an e-mail client application is installed on these devices. The mail server 104 may for example be any data processing device capable of receiving, processing and forwarding e-mails in accordance with the parameters specified in the e-mail. For example the mail server 104 may be provided by the provider of the e-mail address corresponding to the mail client of the sender 102.

In FIG. 1 the usual way of a group e-mail when being sent from a sender mail client 102 to a plurality of recipient mail clients 106 is indicated by arrows. The sender may create an e-mail by specifying the recipients of the e-mail in a corresponding address field. In this context it may also be possible to specify groups of recipients, wherein the e-mail is then sent to the e-mail addresses of the recipients comprised in this group. Further the sender may define a mail body comprising for example text information, images, hyperlinks and further attachments. The e-mail is then forwarded from the mail client of the sender 102 via network 108 to the mail server 104 of the provider of the sender's e-mail address. The mail server 104 may then forward the e-mail in accordance with the recipient e-mail addresses as specified in the "to" field of the e-mail to the corresponding e-mail clients 106 of the recipients. However, the e-mail received by the plurality of mail clients of the recipients 106 will always comprise the same content. If the sender intends to send personalized e-mails to at least a subset of the recipients, the sender will have to create individual e-mails for each of the recipients to whom he intends to send a personalized e-mail.

Figure 2:
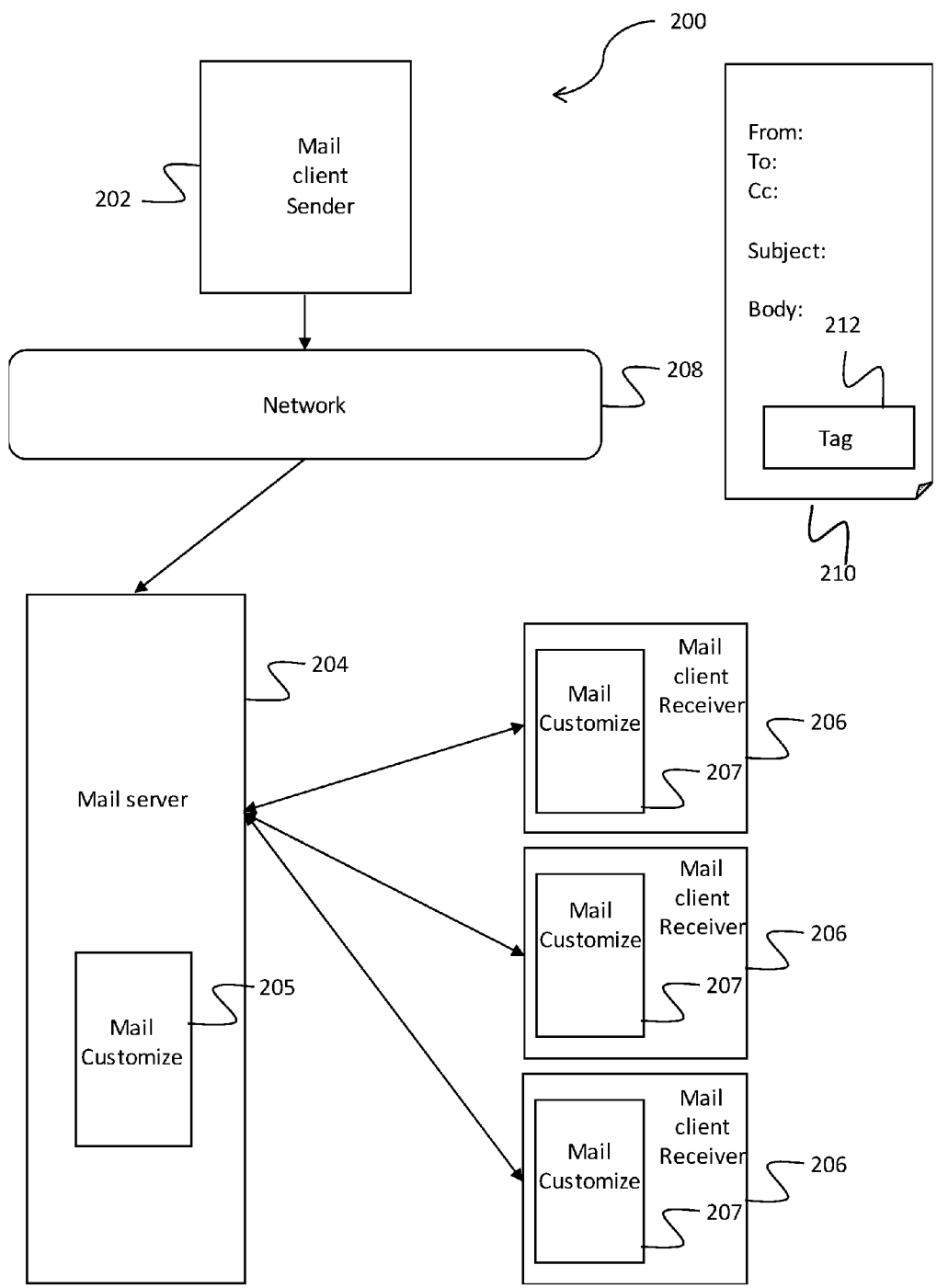
FIG. 2 depicts a block diagram of a telecommunication system in accordance with embodiments of the present disclosure.

This may however be overcome with the telecommunication system 200 as illustrated in FIG. 2 in accordance with embodiments. Like the telecommunications system 100 depicted in FIG. 1, the telecommunication system 200 comprises a mail client of a sender 202, a mail server 204 and a plurality of mail clients of recipients 206. The mail client of the sender 202, the mail server 204 and the plurality of mail clients of recipients 206 are connected via a network 208. However the mail server 204 and the plurality of mail clients of recipients 206 differ from the corresponding entities described with reference to FIG. 1 in that the mail server 204 as well as the plurality of mail clients of recipients 206 comprise program modules for mail customization 205, 207. These mail customization program modules may be operable to determine and interpret tags comprised in an e-mail as will be discussed in the following.

In addition to the telecommunication system 200, FIG. 2 also depicts an example of the contents of an e-mail 210. The e-mail 210 comprises address fields defining the sender of the e-mail 210, the recipient of the e-mail 210 and the recipients which will receive a copy of the e-mail 210. Further the e-mail 210 comprises a field for specifying the subject of the e-mail 210 as well as a mail body. As illustrated in FIG. 2, the mail body of the e-mail 210 may comprise a tag 212. The tag 212 may comprise information on further dynamically-generated content which shall be added to and/or deleted from and/or replaced in the mail body of the e-mail by the mail client of the corresponding recipient 206 or the mail server 204 depending on the recipient of the e-mail 210 as specified in the "to" or "cc" field.

For example, the mail body of the e-mail 210 sent from the mail client of the sender 202 to the mail clients of the recipients 206 may comprise a text, wherein parts of the text may only be read by a subset of the recipients. To this end the sender may specify the corresponding text passages in the tag 212 and encrypt the text passages, for example, by using a public key cryptography scheme using the public keys of the corresponding recipients. Upon receiving the e-mail, the mail clients of the recipients may then determine whether the encrypted part of the e-mail 210 can be decrypted or whether the encrypted part of the e-mail is meant to be read by the corresponding recipient. Only in the case where the tag 212 indicates that the encrypted part of the message is meant to be read by the recipient will the corresponding mail client 206 decrypt the encrypted parts of the text massage and display the text to the user.

It has to be noted that the tag 212 may also specify which attachments of the e-mail are meant to be provided to which recipient. Further it may also be possible to design the tag 212 such that, upon interpretation of the tag 212 by the e-mail client of the recipient 206, the "subject" field of the e-mail is adapted to correspond to the recipient.

Figure 3:
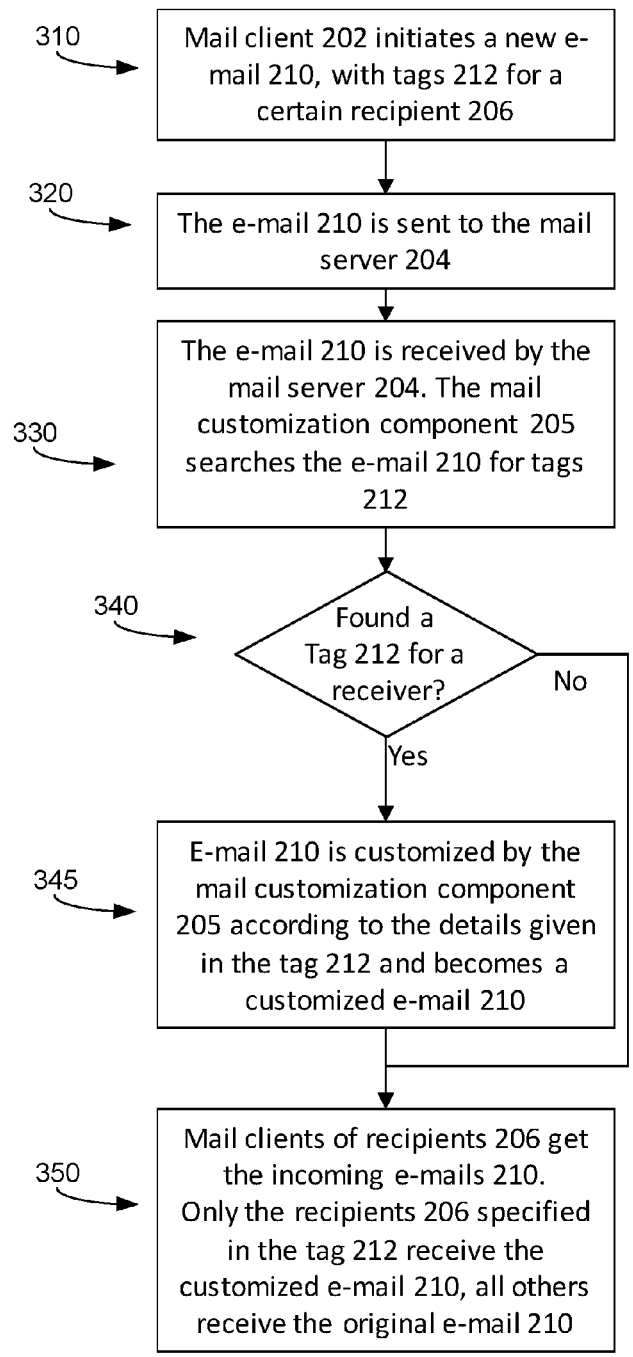
FIG. 3 depicts a flowchart of a method for communicating an e-mail in accordance with embodiments of the disclosure.

FIG. 3 depicts a flowchart of a method for communicating an e-mail in accordance with embodiments of the disclosure. FIG. 3 illustrates how the program module for mail customization 205 of the mail server 204 may process an e-mail comprising a tag 212. In a first method step 310, the mail client of the sender 202 initiates a new e-mail 210 comprising tags 212 for a group of recipients or a single recipient from a plurality of recipients. As described above, the tag 212 may indicate which content of the e-mail 210 shall be displayed to which recipient. Per step 320, the e-mail 210 is then sent to the mail server 204. Per steps 330, once the mail server 204 receives the e-mail 210 the program module for mail customization 205 starts scanning the e-mail for tags 212. Per step 340 and in the situation where no tags 212 are found in the e-mail 210, the e-mail 210 is forwarded to the mail clients of the recipients 206 without changing anything in the contents of the e-mail 210. Per step 350 and as a result, all mail clients of the recipients 206 specified in the "to" field of the e-mail 210 receive an e-mail 210 with identical content.

Per step 340 and if a tag 212 is found in the e-mail 212 by the program module for mail customization 205, per step 345 the program module for mail customization 205 creates customized e-mails 210 for each of the recipients specified by the tag 212 in accordance with the details given in the tag 212. As a result, the mail server 204 creates a plurality of e-mails 210, wherein the e-mails may comprise personalized information after being processed by the program module for mail customization 205. Per step 350, the personalized e-mails 210 are then forwarded to the corresponding mail clients of the recipients. The recipients specified in the tag 212 will receive e-mails 210 with personalized content, while the recipients not specified will receive the standard e-mail without the additional content.

Figure 4:
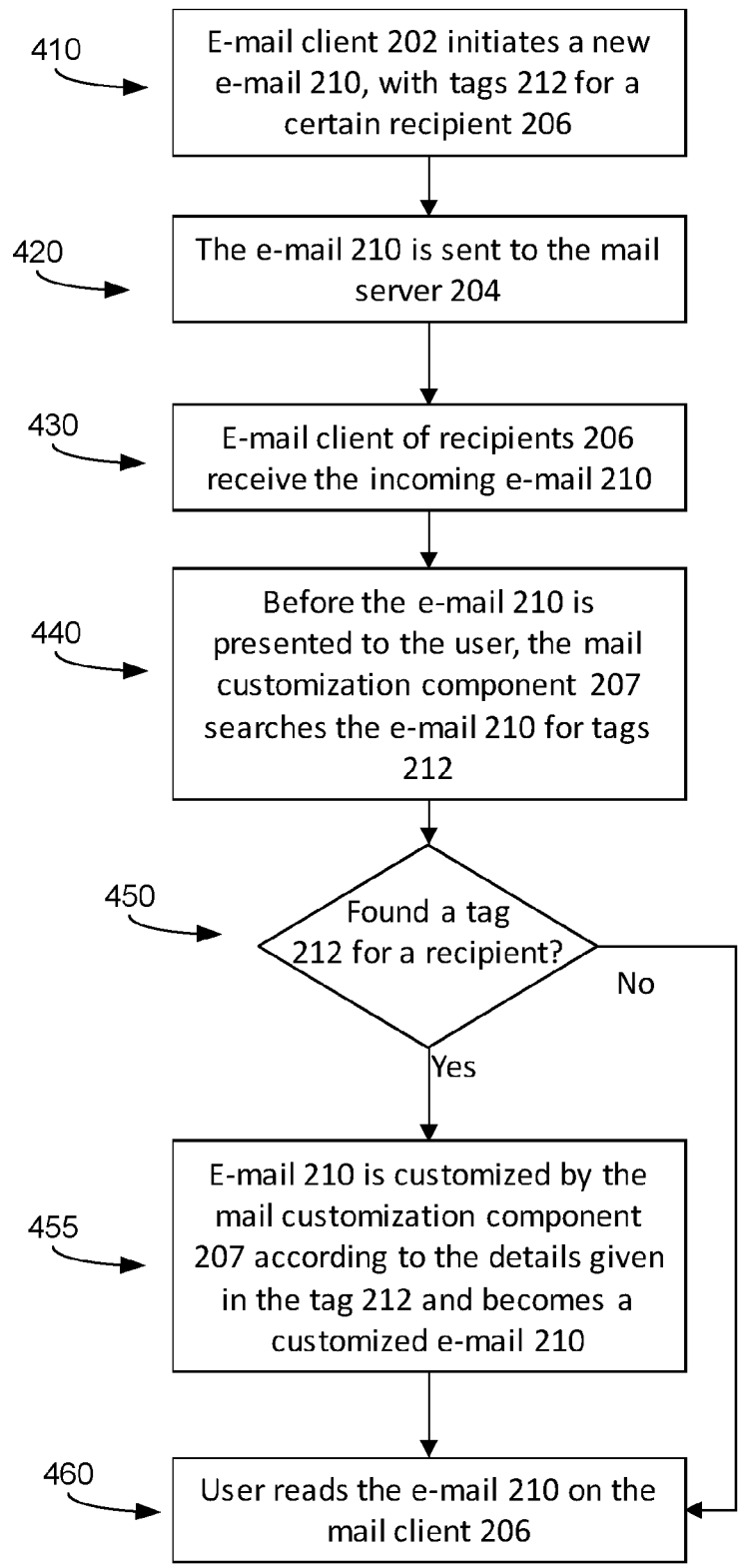
FIG. 4 depicts a flowchart of a further method for communicating an e-mail in accordance with embodiments of the present disclosure.

FIG. 4 depicts a flowchart of a further method for communicating an e-mail in accordance with embodiments of the present disclosure. FIG. 4 illustrates how the program module for mail customization 207 of the mail client of an e-mail recipient 206 may process an e-mail 210 comprising a tag 212. Per 410 and analogously to the embodiment described in FIG. 3, the mail client of the sender 202 initiates a new e-mail 210 comprising tags 212 for a group of recipients or a single recipient from a plurality of recipients. Per 420, the e-mail 210 is then forwarded to the mail server 204. Per 430, the mail server 204 relays the mail 210 to the mail clients of the plurality of recipients. Per 440 and before the e-mail 210 is presented to a recipient, the program module for mail customization 207 of the mail client 206 searches the received e-mail 210 for a tag 212. Per 450 and in the situation where no tag is found, per 460 the mail 210 is displayed to the user. Per 450 and if a tag is found, per 455 the program module 207 customizes the mail content in accordance with the information comprised in the tag 212, and per 460 the customized mail comprising the additional content is displayed to the user.

Figure 5:
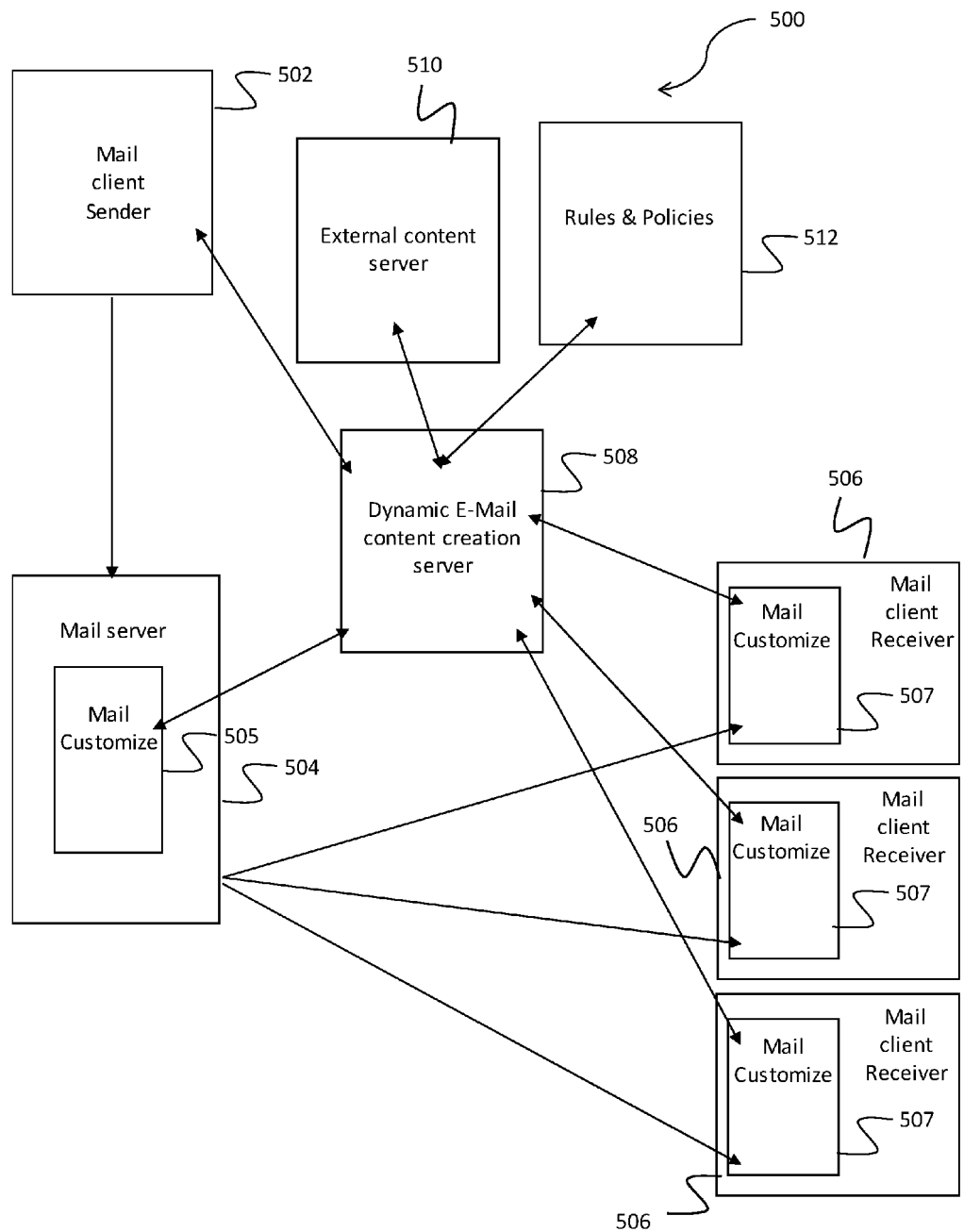
FIG. 5 depicts a block diagram of a further telecommunication in accordance with embodiments of the present disclosure.

A further embodiment of a telecommunication system for practicing the disclosure is depicted in FIG. 5 in accordance with embodiments. The telecommunication system 500 depicted in FIG. 5 comprises a mail client of a sender 502, a mail server 504 and a plurality of mail clients of recipients 506. The mail client of the sender 502, the mail server 504 and the plurality of mail clients of recipients 506 may be identical to the entities described with reference to FIG. 2 and may be connected via a network like the internet. The telecommunication system 500 further comprises one or more remote data sources like a dynamic e-mail content creation server 508, an external content server 510 as well as a server 512 providing rules and policies which have to be obeyed when processing an e-mail 210.

The telecommunication system 500 is operable to process the same type of e-mail 210 comprising a tag 212 as the telecommunication system 200, as the mail server as well as the mail clients of the plurality of recipients 506 comprise corresponding program modules for mail customization 505, 507. However the telecommunication system 500 is also operable to process e-mails 210 comprising a tag which indicates, that dynamically-generated content shall be added to the e-mail 210 depending on the recipient of the e-mail. Dynamically-generated content can be understood as content which is not available at the moment the e-mail 210 is created but shall be created and inserted into the e-mail the moment the e-mail is processed by the mail customization module 505 of the mail server 504 or the mail customization module 507 of the mail client 506 of a recipient.

In order to provide the dynamically-generated content, the mail server 504, as well as the mail clients 506 of the recipients, is operable to address the dynamic e-mail content creation server 508. The dynamic e-mail content creation server 508 is further operable to address the external content server 510 and the server for rules and policies 512 in order to gather the information necessary to create the dynamically-generated content as specified in the tag 212.

Figure 6:
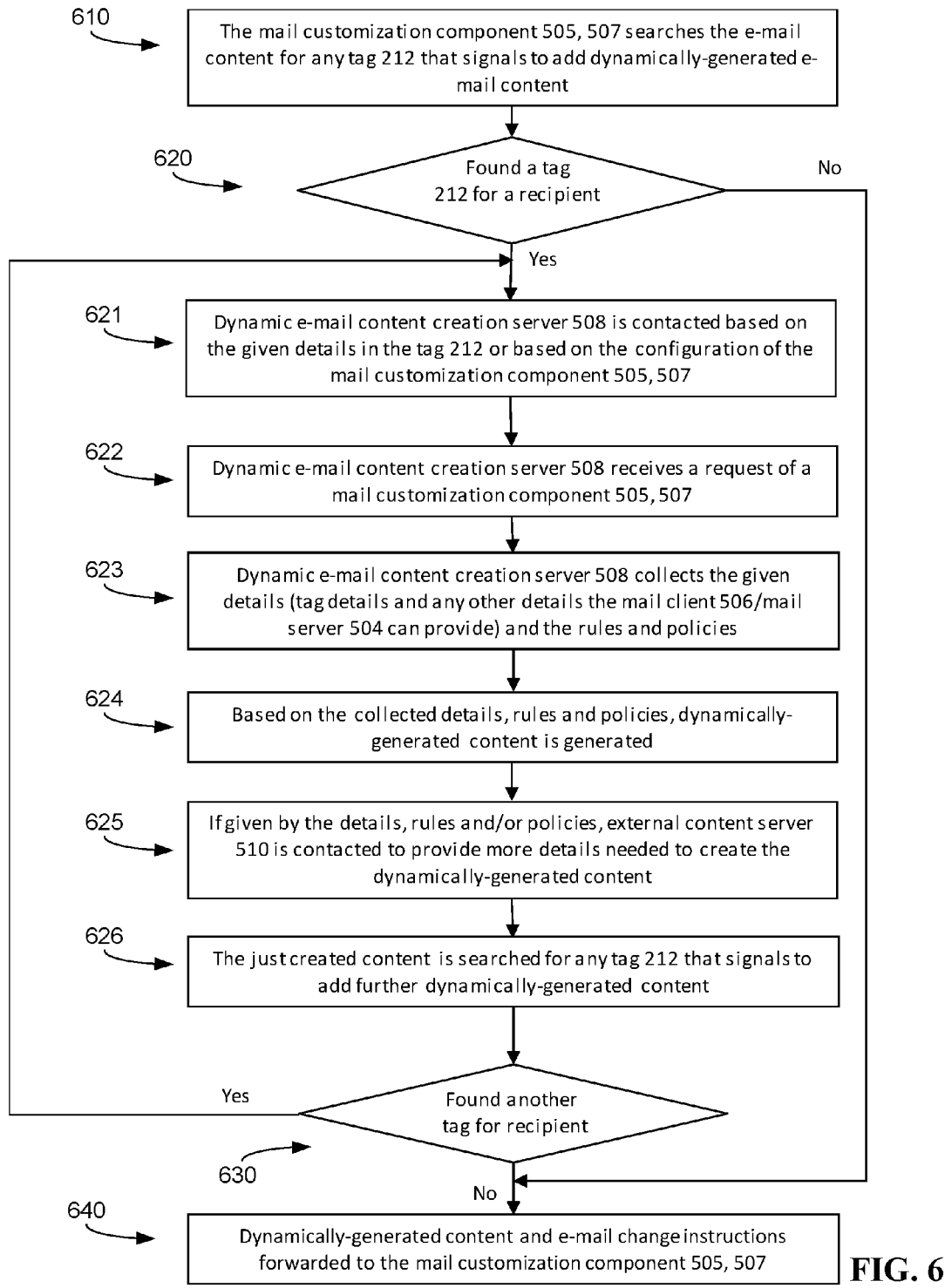
FIG. 6 depicts a flowchart of a method for processing an e-mail comprising tags in accordance with embodiments of the present disclosure.

A flow chart of a corresponding method for processing an e-mail comprising tags 212 is described in FIG. 6. The method described may be performed by both the mail customization module 505 of the mail server, and the mail customization module 507 of a mail client 506 of a recipient. Per 610, the program module for mail customization 505, 507 searches a received e-mail 210 for any tag 212 indicating that dynamically-generated content shall be included into the e-mail. In the situation where no such tag 212 can be found, the e-mail is displayed or forwarded for display without any changes in the contents of the e-mail. If a tag 212 is found, the dynamic e-mail content creation server 508 is contacted based on the details given by the found tag 212 or based on a configuration of the program module for e-mail customization 505, 507. As a result, the dynamic e-mail content creation server 508 receives a corresponding request. Thereupon the dynamic e-mail content creation server 508 collects the given details like the tag details or any other details the mail client 506 or mail server 504 can provide as well as possible corresponding rules and policies. To this end the dynamic e-mail content creation server 508 is operable to address the mail server, the mail client of the recipient 506, as well as the server for rules and policies 512.

Based on these details, rules and policies the dynamically-generated content is created. If given by the determined details, rules and or policies, additional information sources like the external content server 510 may be contacted to provide the details and information needed to create the dynamically-generated content in accordance with the information given by the tag 212. The thus created content may then be forwarded to the mail server 504 or the mail client 506 of the recipient. The received dynamically-generated content may then be searched for further tags which may indicate that more dynamically-generated content has to be added in order to comply with the prerequisites given by the tag 212. In the situation where a further tag has been determined, the method starts all over again with the method step of contacting the dynamic e-mail content creation server and providing the information comprised in the newly found tag 212. In the situation where no further tags are found, the e-mail 210 is forwarded to the mail client 506 of the recipient or is displayed to the recipient by the mail client 506.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for communicating an e-mail from a sender to a plurality of recipients, the e-mail comprising general content, the general content being identical for all recipients of the plurality of recipients, the system comprising:
   a memory; and
   a processor communicatively coupled to the memory, the processor configured to perform a method comprising:
      receiving a definition of the plurality of recipients for the e-mail;
      receiving the general content;
      inserting a tag into a body of the e-mail, the tag being indicative of personalized information designated for a recipient of the plurality of recipients, the personalized information further including a description of an event, the included description further providing a link to indicate attendance to the event, wherein the included description and the provided link are accessible through a remote data source made available to the plurality of recipients;

sending the e-mail to the plurality of recipients, wherein the inserted tag of the sent e-mail provides an indication to each recipient to adapt the general content of the e-mail with dynamically-generated content, based on the personalized information, for each recipient of the plurality of recipients;

detecting that a first recipient of the plurality of the recipients has clicked the provided link;

determining, based on the detected clicked provided link, that a maximum attendance for the event has been reached;

causing, based on the detected clicked provided link by the first recipient and in response to the determined maximum attendance, the included description and the provided link to not be displayed to the plurality of recipients of other than the first recipient.

2. The system of claim 1, wherein the dynamically-generated content depends on a variable, the variable selected from a group consisting of a date the tag was interpreted, a date the tag was received, a time the tag was interpreted, a time the tag was received, a location the tag was interpreted and a location the tag was received.

3. The system of claim 1, wherein the tag specifies the remote data source, and wherein the adapting the general content comprises querying the remote data source for the dynamically-generated content to be inserted into the e-mail.

4. The system of claim 3, wherein the adapting the general content further comprises:

receiving a command instruction; and informing the remote data source about the command instruction, the command instruction being adapted for modifying further dynamically-generated content queried from the remote data source for further recipients of the e-mail.

5. The system of claim 1, wherein the e-mail comprises an encrypted data element, wherein the encrypted data element is decipherable only by e-mail clients of a subset of the plurality of recipients, and wherein the adapting the general content comprises decrypting of the encrypted data element to be added to the e-mail.

6. The system of claim 1, wherein the e-mail is sent from the sender to a mail server, wherein the adapting the general content is conducted by the mail server to create a plurality of personalized e-mails comprising the dynamically-generated content, and wherein the method further comprises:

sending of the personalized e-mails to the plurality of recipients by the mail-server.

7. The system of claim 1, wherein the adapting the general content is conducted by the e-mail client of a recipient upon receiving the e-mail.

8. The system of claim 1, wherein the adapting the general content is selected from the group consisting of adding to the general content, deleting the general content, and replacing the general content.

9. A computer program product for processing an e-mail by an e-mail client of a recipient of the e-mail, a body of the e-mail comprising general content and a tag, the computer program product comprising a non-transitory computer readable storage medium having program instructions embodied therewith, the program instruction instructions configured to cause, when read by a processor, a method comprising:

receiving the e-mail;

adding, based on the tag in the body of the e-mail, dynamically-generated content to the body of the e-mail, the dynamically-generated content comprising personalized information for the recipient, the tag further comprising an event location of an event, the tag further comprises instructions to utilize a navigation program; and providing the e-mail comprising the general content and the dynamically-generated content to the recipient, wherein the dynamically-generated content of the email comprises driving directions for the recipient to the event location by the utilized navigation program.

10. The computer program product of claim 9, wherein the dynamically-generated content depends on a variable, the variable selected from a group consisting of a date the tag was interpreted, a date the tag was received, a time the tag was interpreted, a time the tag was received, a location the tag was interpreted and a location the tag was received.

11. The computer program product of claim 9, wherein a second tag in the body of the email specifies a remote data source, and wherein the adding is further based on the second tag, and wherein the adding the dynamically-generated content comprises querying the remote data source for the dynamically-generated content to be inserted into the e-mail.

12. The computer program product of claim 11, wherein the method further comprises:

receiving a command instruction at the e-mail client of the recipient;

informing the remote data source about the command instruction, the command instruction being adapted for modifying further dynamically-generated content queried from the remote data source for further recipients of the e-mail.

* * * * *